Figure 1:
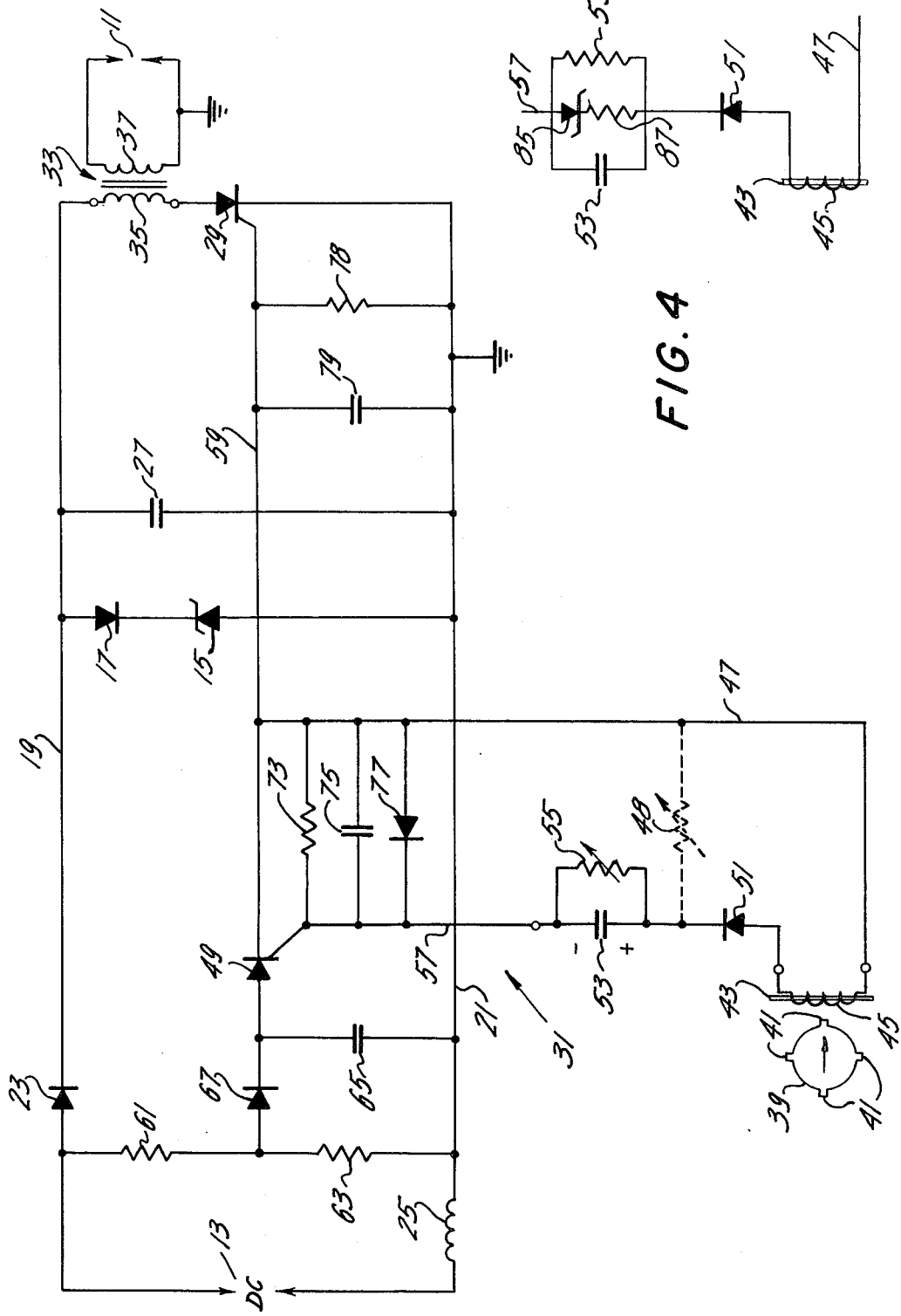

United States Patent [19]
Van Siclen, Jr.

[11] 3,952,715
[45] Apr. 27, 1976

[54] VARIABLE AND CONSTANT TIMING FOR BREAKERLESS IGNITION

[75] Inventor: Howard E. Van Siclen, Jr., Sidney, N.Y.

[73] Assignee: The Bendix Corporation, Southfield, Mich.

[22] Filed: May 6, 1974

[21] Appl. No.: 467,325

[52] U.S. Cl. .................. 123/117 R; 123/148 E; 315/209 CD; 315/209 SC
[51] Int. Cl.² .................. F02P 1/00; F02P 5/04
[58] Field of Search...... 123/117 R, 148 E, 148 OC, 123/148 MC; 315/209 CD, 240, 209 SC

[56] References Cited
UNITED STATES PATENTS

| | | | |
|---|---|---|---|
| 3,240,198 | 3/1966 | Loudon | 123/148 E |
| 3,277,875 | 10/1966 | Miki | 123/148 E |
| 3,291,108 | 12/1966 | Schneider | 123/148 E |
| 3,356,082 | 12/1967 | Jukes | 123/148 E |
| 3,500,809 | 3/1970 | Hohne | 123/148 MC |
| 3,573,545 | 4/1971 | Warner | 123/148 E |
| 3,587,549 | 6/1971 | Kebbon | 123/148 OC |
| 3,587,550 | 6/1971 | Zechlin | 123/148 MC |
| 3,815,560 | 6/1974 | Wahl | 123/117 R |

*Primary Examiner*—Charles J. Myhre
*Assistant Examiner*—Ronald B. Cox
*Attorney, Agent, or Firm*—S. H. Hartz

[57] ABSTRACT

A pulse generating system especially adapted for use in ignition systems of internal combustion engines including a solid state pulse triggering circuit for controlling spark timing and in which the timing is advanced with increased engine speed and can be changed independently of engine speed by a voltage biasing means. The triggering circuit can be programmed to provide any desired spark timing and can be controlled in response to a condition, such as engine fuel, temperature, pressure or other parameter.

9 Claims, 7 Drawing Figures

VARIABLE AND CONSTANT TIMING FOR BREAKERLESS IGNITION

The invention relates to electrical apparatus and, more particularly to a system for generating timed pulses especially adapted for use in an ignition system for an internal combustion engine.

In U.S. Pat. No. 3,240,198 issued Mar. 15, 1966 and assigned to the same assignee as the present application, a pulse generating system especially adapted for use in ignition systems for internal combustion engines is described in which the timing of the generated pulses is advanced upon an increase in engine speed.

A system constructed according to the present invention in addition to advancing the timing of generated pulses in response to increased engine speed also has means for changing the timing of the pulses independently of engine speed. The timing can be programmed to provide any desired advance or the timing can be controlled automatically in response to a condition, such as engine fuel, temperature, pressure or other parameter.

The invention contemplates a triggering circuit comprising a solid state electronic switching device, pulse generating means for generating a succession of electrical trigger pulses to switch the switching device, voltage bias means connected between the pulse generating means and the switching device, and means for controlling the voltage on the bias means to control the switching time relative to the trigger pulses. The invention also contemplates a triggering circuit of the kind described briefly above for use in an internal combustion engine having an ignition system including at least one spark plug and means for firing the spark plug including a capacitor and a solid state electronic switching device. The triggering circuit switches the electronic switching device to discharge the capacitor and fire the spark plug. Changing the voltage on the biasing means of the triggering circuit changes the time in the engine cycle the second switching device is made conductive to change the spark timing.

An object of the invention is to provide a pulse generating system especially adapted for use in ignition systems of internal combustion engines and in which the timing of the engine can be programmed to provide any desired speed advance.

Another object is to provide a pulse generating system in which the timing of the engine can be controlled manually or automatically in response to a condition, such as engine fuel, temperature, pressure or other parameter.

Another object is to provide a pulse generating system in which the timing of the engine can be controlled independently of engine speed.

These and other objects and advantages of the invention will appear more fully hereinafter from a consideration of the detailed description which follows, taken together with the accompanying drawings wherein three embodiments of the invention are illustrated by way of example. It is to be understood, however, that the drawings are for the purpose of illustration only and are not a definition of the limits of the invention, reference being had to the appended claims for this purpose.

Figure 2:
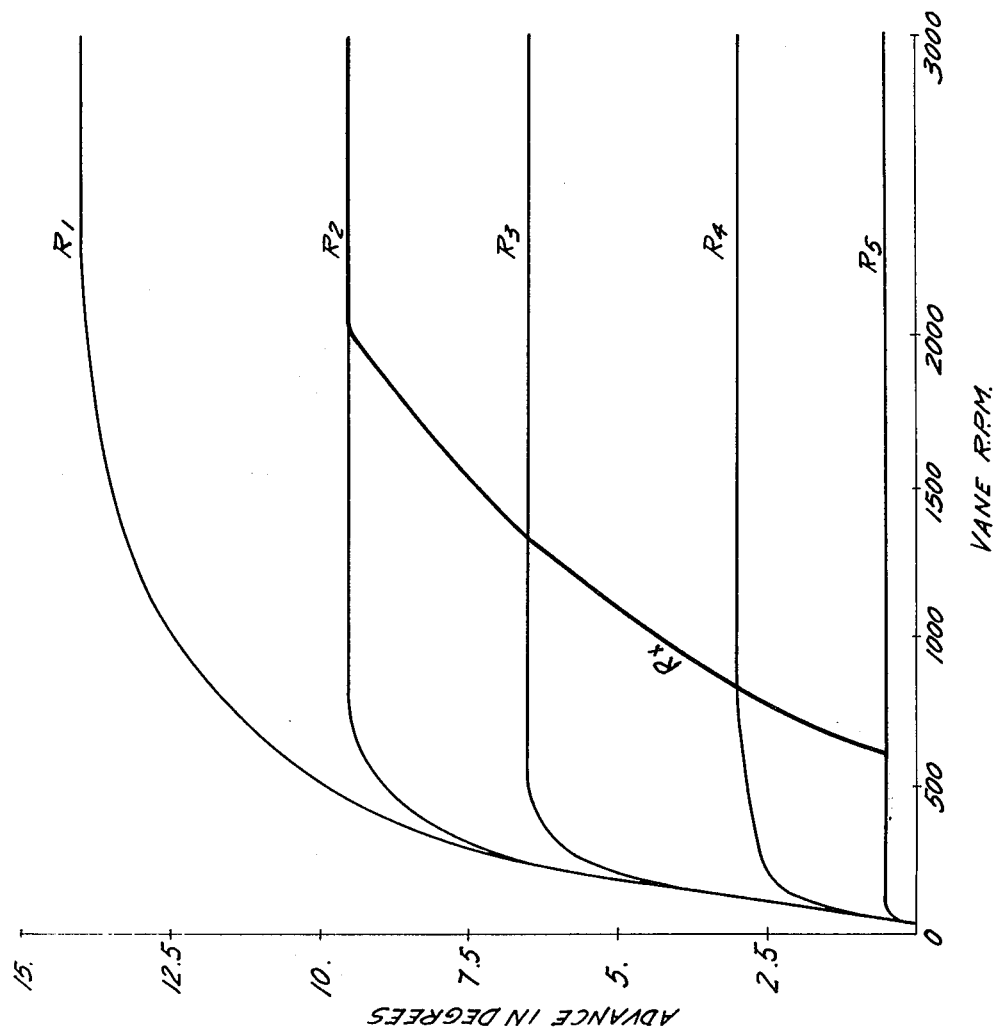

In the drawings,

FIG. 1 is a schematic wiring diagram of an ignition system for an internal combustion engine including a triggering circuit constructed according to the invention, FIG. 2 are graphs showing the relationship of spark timing to engine speed for several values of resistor 55 in the triggering circuit.

Figure 4:
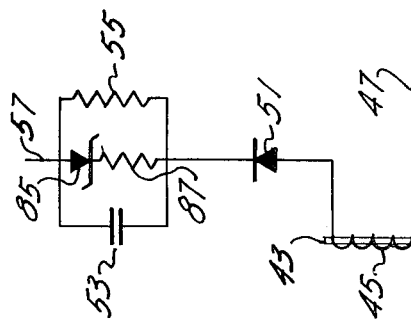
Figure 3:
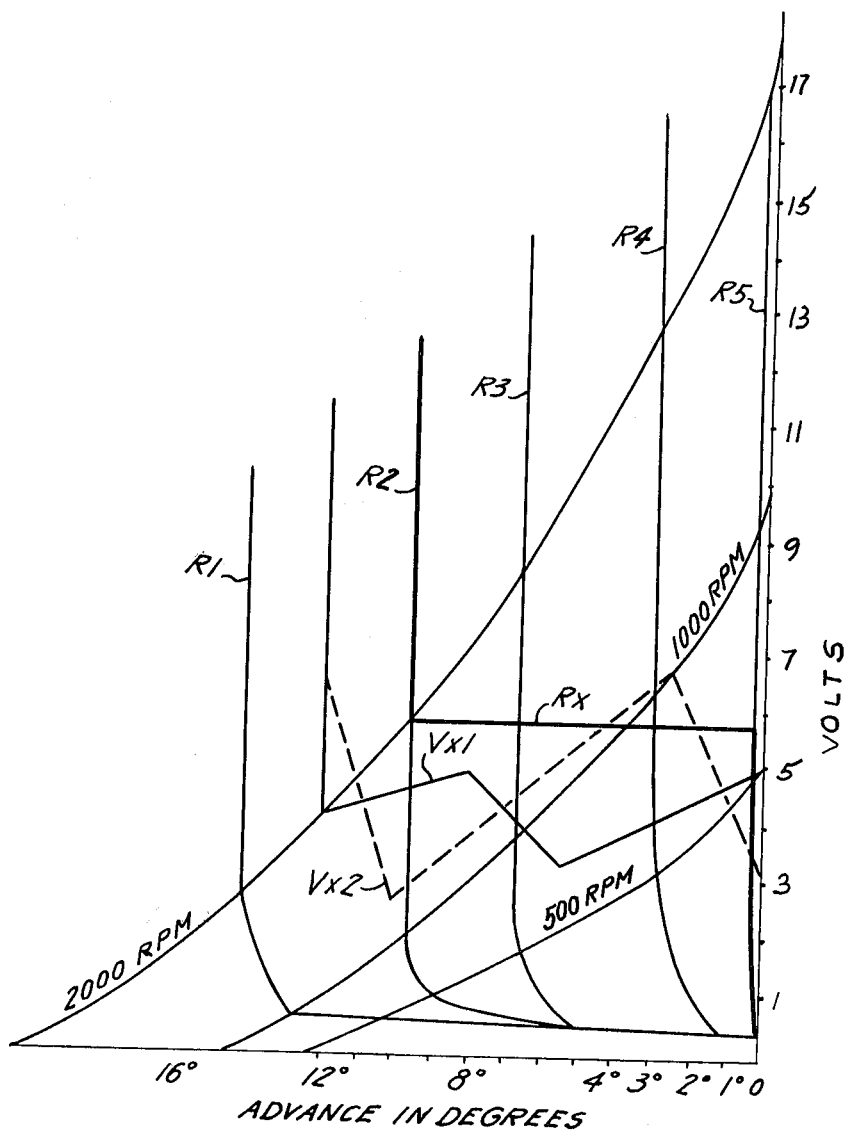
Figure 5:
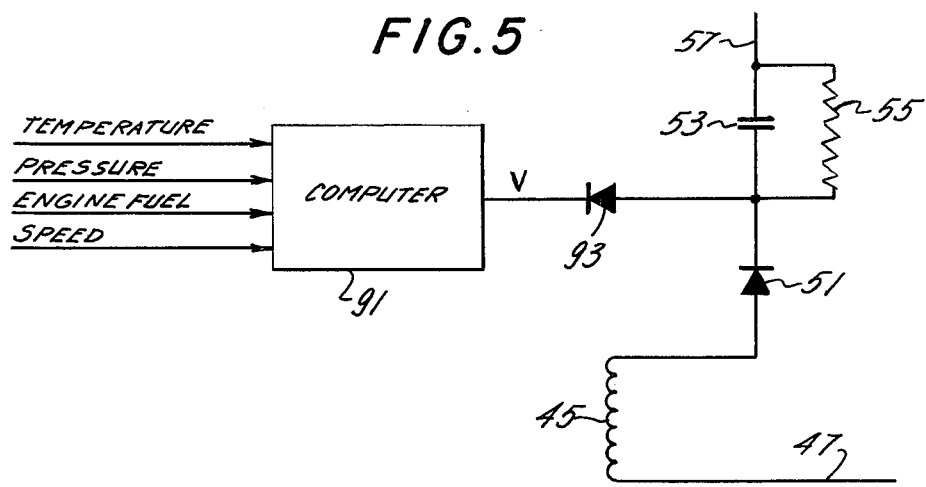
Figure 6:
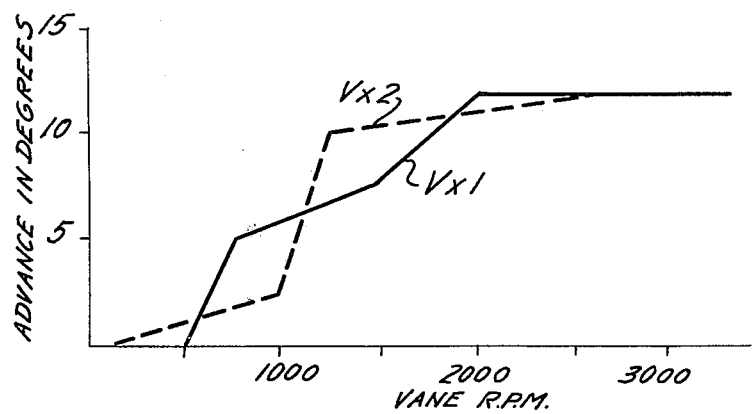
Figure 7:
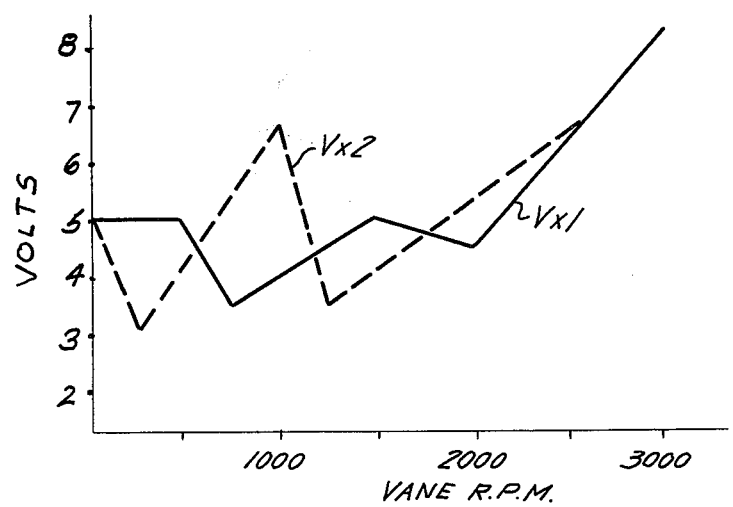

FIG. 3 illustrates the manner in which the timing of the spark discharge changes with engine speed and upon changing the value of resistor 55, FIG. 4 shows a second embodiment of the invention for controlling the voltage on the voltage bias means, FIG. 5 shows a third embodiment of the invention using a computer for controlling the voltage on the voltage bias means, FIG. 6 are graphs showing the relationship of spark timing to engine speed for programmed voltage values in the embodiment of FIG. 5, and FIG. 7 are graphs showing voltages supplied by the computer in FIG. 5 at various vane RPM to provide the corresponding spark advances shown in FIG. 6.

In FIG. 1 there is shown a novel ignition system constructed according to the invention for supplying timed spark discharges to the spark plugs 11 of an internal combustion engine. Any number of spark plugs may be used and the spark discharges may be distributed to the spark plugs in timed relation to the engine through a distribution means (not shown) in the manner shown and described in the above patent.

Direct current power for the system may be supplied by a magneto or generator through a full wave rectifier, or any other suitable source 13 may be used. The voltage across 13 may be regulated if necessary by a Zener diode 15 and a diode 17 connected in series opposition across leads 19 and 21. Lead 19 is connected to source 13 through a diode 23 and lead 21 is connected to source 13 through an inductance 25. A capacitor 27 is connected between leads 19 and 21 and is charged periodically by th D.C. source 13 through diode 23 and inductor 25. Capacitor 27 discharges when a silicon controlled rectifier 29 is triggered to conduct by a triggering circuit generally designated by the number 31. The capacitor upon discharging should provide sufficient energy to provide a suitable spark to spark plug 11 through a transformer 33 having a primary winding 35 connected in series with silicon controlled rectifier 29 across leads 19 and 21 and having a secondary winding 37 connected in series with spark plug 11.

A trigger wheel 39 having a plurality of projections or vanes 41 equal to the number of spark plugs 11 is rotated in synchronism with the distribution means. Vanes 41 of trigger wheel 39 rotate through the flux of a permanent mangent 43 having a pick up coil 45 wound thereon. A pulse is generated in pick up coil 45 each time a vane 41 passes through the flux of the permanent magnet and the pulse amplitude increases with increased speed of trigger wheel 39 as shown in FIG. 3. In FIG. 1, one end of coil 45 is connected through a lead 47 to the cathode of a silicon controlled rectifier 49. The other end of coil 45 is connected through a diode 51 and a voltage biasing means shown as a capacitor 53 to the gate of SCR 49 by a lead 57. A variable resistor 55 is connected in parallel with capacitor 53 for controlling the voltage capacitor 53 discharges to between pulses. The cathode of SCR 49 is connected also to the gate of SCR 29 through a lead 59. A diode 77 is connected across leads 47, 57 to keep reverse gate to cathode voltage to a low value.

A voltage divider including resistors 61, 63 is connected across leads 19, 21. A capacitor 65 is connected to lead 21 and through a diode 67 to the junction of resistors 61 and 63. The capacitor 65 also is connected to the anode of SCR 49.

Each time a trigger pulse is generated in pick up coil 45 SCR 49 is turned on and discharges capacitor 65 through lead 59, the gate to cathode circuit of SCR 29 and lead 21. This provides a positive pulse on the gate of SCR 29 to turn on SCR 29 to discharge capacitor 27 and fire spark plug 11 as described above.

RF suppression may be provided for SCR 49 by a resistor 73 and a capacitor 75 connected in parallel between leads 47 and 57 across the gate to cathode circuit of the SCR. Similarly, RF suppression may be provided for SCR 29 by a resistor 78 and a capacitor 79 connected in parallel between leads 59 and 21 across the gate to cathode circuit of SCR 29.

The system described above operates as follows: capacitors 65 and 27 are fully charged by D.C. source 13 between successive pulses generated in pick up coil 45. When the gate of SCR 49 reaches the threshold voltage in response to a pulse from pick up coil 45, the SCR conducts and capacitor 65 discharges through the SCR and provides a pulse to the gate of SCR 29 and increases the gate voltage of SCR 29 above the threshold so that it conducts and discharges capacitor 27 through the primary winding 35 of transformer 33. This induces a high voltage in secondary winding 37 causing a spark discharge across the gap of spark plug 11.

The timing of the spark discharge in the engine cycle is determined by the amplitude of the trigger pulse and by the voltage on capacitor 53 at the time the trigger pulse is generated. In the present embodiment, the voltage on capacitor 53 is determined by the amplitude of the trigger pulse and by the value of resistor 55. The trigger pulse upon gating SCR 49 charges capacitor 53 to a voltage corresponding to the amplitude of the trigger pulse and in the interval between trigger pulses the capacitor discharges through resistor 55 to a voltage determined by the value of resistor 55. The pulses gate SCR 49 when their amplitude exceeds the voltage capacitor 53 discharges to in the interval between pulses.

Instead of using resistor 55, variable resistor 48 shown in broken lines in FIG. 1 may be connected between lead 47 and the cathode of diode 51 across coil 45 to control the voltage on capacitor 53. With this arrangement capacitor 53 in the interval between trigger pulses discharges through resistor 48, lead 47, diode 77 and lead 57 to a voltage determined by the value of resistor 48. Of course, resistor 48 cannot have too low a value because it is connected across coil 45 and would adversely affect the amplitude of the trigger pulses.

FIG. 2 shows graphs for several values of resistor 55 in which the spark advance in degrees is plotted as ordinate and the vane RPM is plotted as abscissa. Curves R1, R2, R3, R4 and R5 correspond to the values of resistor 55 equal to 0, 5K, 10K, 30K and 100K ohms, respectively. As the engine speed increases the advance attains a maximum determined by the value of resistor 55 and the advance is constant thereafter because diode 51 blocks the reverse voltage from coil 45. The smaller the value of resistor 55 the greater the maximum spark advance in the engine cycle. For example, at a constant vane speed of 2,000 RPM, with a 0 value resistor 55 the spark advance is 14° as shown by curve R1, for a 5K resistor the advance is 9½° as shown by curve R2, for a 10K resistor the advance is 6½° as shown by curve R3, for a 30K resistor the advance is 3° as shown by curve R4 and for a 100K resistor the advance is only 0.5° as shown by curve R5.

FIG. 3 shows the relative voltage amplitudes of positive trigger pulses from coil 45 generated at engine speeds of 500 RPM, 1000 RPM and 2000 RPM with the voltage plotted as ordinate and the spark advance in degrees plotted as abscissa. Also, FIG. 3 shows voltage of curves R1 to R5 of FIG. 2 superimposed on the pulse curves. At a constant speed, smaller resistors 55 permit capacitor 53 to discharge to lower voltages in the intervals between pulses than the larger resistors so that the threshold voltage required to gate SCR 49 is reached at lower voltages on the pulse curves in FIG. 3 for lower value resistors. Because of the broad bases of the pulse curves the threshold voltage of SCR 49 advances in the engine cycle accordingly. Since the amplitudes of the pulses and the lengths of their bases decrease with decrease in speed of trigger wheel 39 as determined by the speed of the engine the spark discharge advance is less at lower speeds than at higher speeds for a given value resistor until a maximum advance is reached.

Any desired speed advance curve can be generated by changing the voltage capacitor 53 discharges to between pulses and in the present embodiment the voltage can be changed by changing the value of resistor 55. An exemplary speed advance curve is shown by the curve Rx in FIG. 2. Predetermined values of resistor 55 are selected for predetermined spark advance at different engine speeds. For example, the curve RX follows curve R5 to 600 RPM, and crosses R4 at 850 RPM, R3 at 1300 RPM, and then follows R2 above 2000 RPM. Spark advances for intermediate speeds are controlled by selecting the proper values of resistor 55 on intermediate curves (not shown). Resistor 55 may be a variable resistor to provide analog changes or different value fixed resistors may be connected in series or parallel and switching means may be used to provide a digital change in value and corresponding change in the spark advance.

The voltage level on capacitor 53 at the time the trigger pulse is generated is the important factor in determining the timing of the spark discharge in the engine cycle. A computer can program the voltage of capacitor 53 at the time the trigger pulse is generated either by discharging capacitor 53 to the required voltage or by charging the capacitor to the required voltage. The amplitude of the voltage may correspond to a condition such as one or more engine parameters.

A relatively simple embodiment using a Zener diode in conjunction with resistors to program the voltage level of the capacitor in response to speed is shown in FIG. 4. The circuit differs from FIG. 1 in that a series connected Zener diode 85 and a resistor 87 are connected in parallel with capacitor 53 and resistor 55. This arrangement provides a spark advance curve Rx similar to that shown in FIGS. 2 and 3 when the resistor 55 is 100K and resistor 87 is 5K and the Zener diode voltage is equal to the voltage on capacitor 53 at 2000 RPM. The timing curve Rx follows the curve R5 until the engine speed reaches 600 RPM. Above these speeds capacitor 53 discharges between trigger pulses to the Zener voltage. Only the portion of each pulse above the level the capacitor is charged to passes through the capacitor to trigger SCR 49. As engine speed increases above 600 RPM and the pulse amplitude becomes larger, more of the pulse passes through the capacitor and the timing advances. With a 5K resistor in series with the Zener diode, timing at 2,000 RPM is constant and there is no further advance with increase in speed. By proper selection of the capacitor, resistors and Zener diode any desired advance can be provided.

Another arrangement for programming the voltages on capacitor 53 at the time the trigger pulses are generated is shown in FIG. 5. Only the portion of the circuit which differs from that shown in FIG. 1 is shown in FIG. 5. A computer 91 provides voltages V corresponding to an engine parameter, such as temperature, pressure, engine fuel or speed, to back bias a diode 93 connected between the output of computer 91 and the junction of capacitor 53 and diode 51. In this arrangement resistor 55 connected in parallel with capacitor 53 may have a relatively high value such as 100K ohms or the resistor may be eliminated entirely. In the interval between trigger pulses capacitor 53 discharges through diode 93 to the value of voltage V provided by computer 91. The embodiment shown in FIG. 5 otherwise operates in the same manner as the embodiment of FIG. 1.

FIG. 6 shows curves $Vx1$ and $Vx2$ in which the spark advance in degrees is plotted as ordinate and the vane RPM is plotted as abscissa for programmed values of voltage V. While the vane RPM is taken as an example, any other engine parameter may be selected for controlling the voltage at the output of computer 91.

Curves $Vx1$ and $Vx2$ corresponding to those shown in FIG. 6 are shown in FIG. 3 where advance in degrees is plotted as ordinate and the voltage at the output of computer 91 is plotted as abscissa and the curves are superimposed on the pulse curves.

FIG. 7 shows corresponding curves $Vx1$ and $Vx2$ where the voltage provided by computer 91 for back biasing diode 93 is plotted as ordinate and vane RPM is plotted as abscissa.

A system constructed according to the invention, in addition to advancing the time of spark discharge in response to increased engine speed, also has means for changing the timing of the spark discharge independently of engine speed by changing the voltage on capacitor 53. The timing may be programmed or it may be controlled automatically to provide any desired speed advance by controlling the voltage on capacitor 53 in response to a condition, such as engine fuel, temperature, pressure or other parameter.

What is claimed is:

1. A triggering circuit comprising a solid state electronic switching device, pulse generating means for generating a succession of electrical trigger pulses which change amplitude in response to a condition to switch the switching device, voltage bias means connected between the pulse generating means and the switching device to change the switching time relative to the trigger pulses in response to the condition, and means for controlling the voltage on the bias means independently of pulse amplitude to control the switching time relative to the trigger pulses, the means for controlling the voltage on the bias means being connected in parallel with the bias means and including a resistor connected in parallel with a series connected second resistor and Zener diode.

2. A triggering circuit as described in claim 1 in which the voltage bias means is a capacitor.

3. An internal combustion engine having an ignition system including at least one spark plug, means for firing the spark plug including a solid state electronic switching device, and a triggering circuit for switching the electronic switching device for firing the spark plug comprising a second solid state electronic switching device, pulse generating means for generating a succession of electrical trigger pulses in timed relation to the engine and which increase in amplitude with increase in engine speed to make the second switching device electrically conductive for switching the first device, voltage bias means connected between the pulse generating means and the second switching device to advance with increase in speed the time in the engine cycle the second switching device is made conducting, and means for controlling the voltage on the bias means independently of pulse amplitude to control the time in the engine cycle the second switching device is made conducting to control spark timing, the means for controlling the voltage on the bias means being connected in parallel with the bias means and including a resistor connected in parallel with a series connected resistor and Zener diode.

4. An internal combustion engine having an ignition system including at least one spark plug, means for firing the spark plug including a solid state electronic switching device, and a triggering circuit for switching the electronic switching device for firing the spark plug comprising a second solid state electronic switching device, pulse generating means for generating a succession of electrical trigger pulses in timed relation to the engine and which increase in amplitude with increase in engine speed to make the second switching device electrically conductive for switching the first device, voltage bias means connected between the pulse generating means and the second switching device to advance with increase in speed the time in the engine cycle the second switching device is made conducting, and means for controlling the voltage on the bias means independently of pulse amplitude to control the time in the engine cycle the second switching device is made conducting to control spark timing, the means for controlling the voltage on the bias means including a variable voltage source connected to the bias means for providing voltages corresponding to an engine parameter.

5. An internal combustion engine as described in claim 4 in which the voltage bias means is a capacitor.

6. An internal combustion engine having an ignition system including at least one spark plug, means for firing the spark plug including a solid state electronic switching device, and a triggering circuit for switching the electronic switching device for firing the spark plug comprising a second solid state electronic switching device, pulse generating means for generating a succession of electrical trigger pulses in timed relation to the engine and which increase in amplitude with increase in engine speed to make the second switching device electrically conductive for switching the first device, voltage bias means connected between the pulse generating means and the second switching device to advance with increase in speed the time in the engine cycle the second switching device is made conducting, and means for controlling the voltage on the bias means independently of pulse amplitude to control the time in the engine cycle the second switching device is made conducting to control spark timing, the means for controlling the voltage on the bias means including a computer for programming the voltage in accordance with a condition.

7. An internal combustion engine as described in claim 5 including a diode connected between the variable voltage source and the capacitor and back biased by the voltage source, the diode being arranged to provide a discharge path for the capacitor so the capacitor discharges between trigger pulses to a voltage corresponding to the back biasing voltage.

8. An internal combustion engine as described in claim 6 in which the computer includes a variable voltage source.

9. An internal combustion engine as described in claim 8 in which the bias means is a capacitor and the ignition system has a diode back biased by the voltage source for connecting the voltage source to the capacitor and for controlling discharge of the capacitor to the voltage of the source.

* * * * *